Figures 1, 2:
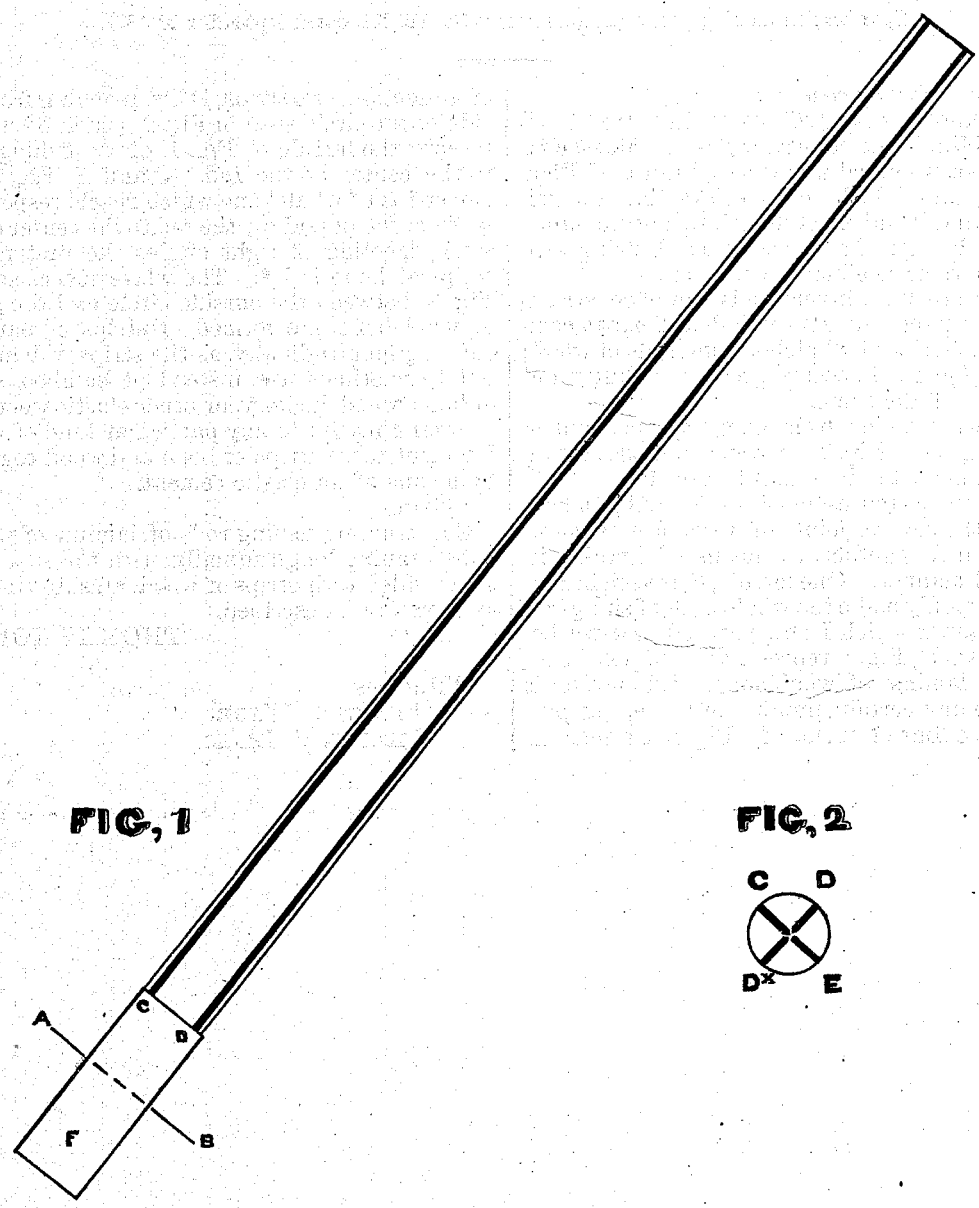

THOMAS TOUT'S
FISHING ROD

No. 119,251.          Patented Sep. 26, 1871.

WITNESSES          INVENTOR 119,251

UNITED STATES PATENT OFFICE

THOMAS TOUT, OF CAMBRIDGE, MASSACHUSETTS.

IMPROVEMENT IN FISHING-RODS.

Specification forming part of Letters Patent No. 119,251, dated September 26, 1871.

*To all whom it may concern:*

Be it known that I, THOMAS TOUT, of Cambridge, Middlesex county, State of Massachusetts, have invented a new and Improved Fishing-Rod; and I do hereby declare that the following is a full and exact description of the same, reference being had to the annexed drawing with letters of reference marked thereon.

The nature of my invention is that of constructing a fishing-rod, and also whip-handles, of a combination of strips of whalebone and rods of wood; and the object is to secure greater pliability and toughness of the same.

Figure 1 is a view from above of one joint of my fishing-rod. Fig. 2 is a vertical cross-section of the same at the line A B in Fig. 1.

The drawing represents a single joint of a fishing-rod, the several joints of which are, when in use, fastened together, by means of ferrules, in the usual manner. One ferrule, F, is seen in Fig. 1. I commonly make the whole of my fishing-rod in the manner which I now proceed to describe. The strips C D, Fig. 1, represent the edges of thin strips or laminæ of whalebone. I do not limit myself to any certain number of these, but prefer to have four of them. In Fig. 2 are seen, in cross-section, two strips, D D*, reaching from the side of the circle seen in Fig. 2 (which circle represents the ferrule F, Fig. 1, of my fishing-rod) to the center of the rod. C and E, Fig. 2, are two strips of whalebone which reach, respectively, from the outside of the rod to the center of the same, meeting at right angles the first-named strips of bone D D*. The white spaces seen in Fig. 2, between the outside circle and the strips of whalebone, are formed of strips of bamboo, running longitudinally, as the strips of bone do; but I sometimes use, instead of bamboo, strips of lance wood, hickory, or other elastic wood, not confining myself to any particular kind of wood. I cement these strips of bone and wood together by means of an elastic cement.

I claim—

Constructing fishing-rods of laminæ of whalebone running longitudinally, with the spaces between filled with strips of wood, all substantially as shown and described.

THOMAS TOUT.

Witnesses:
 FRANK T. WARE,
 LEMUEL P. JENKS. (9)